US012678920B2

(12) United States Patent
Teller

(10) Patent No.: US 12,678,920 B2
(45) Date of Patent: Jul. 14, 2026

(54) HEXAGONAL DRIVER

(71) Applicant: Paul Greg Teller, Fort McMurray (CA)

(72) Inventor: Paul Greg Teller, Fort McMurray (CA)

( * ) Notice: Subject to any disclaimer, the term of this patent is extended or adjusted under 35 U.S.C. 154(b) by 383 days.

(21) Appl. No.: 18/446,580

(22) Filed: Aug. 9, 2023

(65) Prior Publication Data

US 2025/0050477 A1 Feb. 13, 2025

(51) Int. Cl.

| | |
|---|---|
| ***B25B 23/12*** | (2006.01) |
| ***B25B 13/06*** | (2006.01) |
| ***B25B 21/00*** | (2006.01) |
| ***B25B 23/00*** | (2006.01) |

(52) U.S. Cl.

CPC ............ *B25B 23/12* (2013.01); *B25B 13/065* (2013.01); *B25B 23/0035* (2013.01); *B25B 21/00* (2013.01)

(58) Field of Classification Search

CPC ... B25B 23/12; B25B 23/0035; B25B 13/065; B25B 21/00

See application file for complete search history.

(56) References Cited

U.S. PATENT DOCUMENTS

| | | | | |
|---|---|---|---|---|
| 9,694,480 | B2 * | 7/2017 | Brown | B25B 23/12 |
| 12,042,908 | B2 * | 7/2024 | Zhou | B25B 23/0035 |
| 12,318,893 | B2 * | 6/2025 | Hingst | B25B 23/12 |

* cited by examiner

*Primary Examiner* — David B. Thomas

(74) *Attorney, Agent, or Firm* — Orin Del Vecchio

(57) ABSTRACT

A hexagonal driver bit configured to be operably coupled to a power rotary tool wherein the present invention employs a movable magnet assembly so as to facilitate removal of debris accumulated within the cavity of the driver bit. Secured to the shaft of the present invention is a body member that is cylindrical in shape having a first end and a second end. Proximate the first end is an opening providing access to the cavity wherein the cavity has an inner wall formed to mateably engage a fastener head. The body includes a void intermediate a bottom plate member and a rear wall wherein the void houses a movable magnet assembly. The magnet assembly includes a portion external to the body accessible by a user wherein the user can move the magnet assembly between a first and second position. A movement member controls the movement of the magnet assembly.

8 Claims, 4 Drawing Sheets

HEXAGONAL DRIVER

FIELD OF THE INVENTION

The present invention relates generally to tools, more specifically but not by way of limitation, a hexagonal driver bit configured to operably couple with hexagonal shaped fastener heads wherein the present invention includes a movable magnet member that provides an ability to remove metal material lodged within the cavity of the hexagonal driver.

BACKGROUND

Hexagonal driver bits are commonly utilized with drills and impact wrenches to engage fasteners of various sizes and types. These bits are commonly utilized so as to expedite the required tasks as the time required for a drill driven bit is significantly less than employing a manual tool. Hexagonal driver bits are employed in hundreds of applications and many available bits now include a magnet located at the bottom of the cavity. The magnet at the bottom of the cavity of the hexagonal driver bit releasably secures the fastener in the bit which is beneficial when placing the fastener in the location that the fastener will be secured.

One issue with magnetic hexagonal driver bits involves applications where the driver bits are employed in areas that may have metal shavings. During securing items such as but not limited to recently cut metal items it is very common for metal shavings to be present. The metal shavings can be a result of drilling a hole where the fastener will be installed. These shavings can often become lodged within the cavity of the driver bit due to the attraction resulting from the magnet. As shavings become lodged in the cavity of the driver bit the bit will no longer fit securely on the fastener head which can result in stripping of the fastener head and make it difficult to secure the fastener in the desired position.

Accordingly, there is a need for a hexagonal driver bit that is configured with a movable magnet that facilitates the ability to remove any debris that may be trapped within the cavity of the driver bit as a result of the magnetic attraction.

SUMMARY OF THE INVENTION

It is the object of the present invention to provide a magnetic hexagonal driver bit that is configured to be operably coupled with a drill or similar tool wherein the present invention includes a shaft member configured to be inserted into a drill or similar tool.

Another object of the present invention is to provide a hexagonal driver bit that is configured to facilitate removal of metal shavings from a cavity thereof wherein the present invention includes a body member having a cavity with a hexagonal wall shape configured to engage with a hexagonal fastener head.

A further object of the present invention is to provide a magnetic hexagonal driver bit that is configured to be operably coupled with a drill or similar tool wherein the cavity includes a bottom plate member distal to the opening of the cavity.

Yet a further object of the present invention is to provide a hexagonal driver bit that is configured to facilitate removal of metal shavings from a cavity thereof wherein the present invention includes a magnet assembly having a magnet adjacent the bottom plate member opposite the cavity of the body.

Still another object of the present invention is to provide a magnetic hexagonal driver bit that is configured to be operably coupled with a drill or similar tool wherein the magnet assembly is slidably coupled with the body and configured to be moved between a first position and a second position.

An additional object of the present invention is to provide a hexagonal driver bit that is configured to facilitate removal of metal shavings from a cavity thereof wherein the magnet assembly movement is controlled employing a spring member.

Yet a further object of the present invention is to provide a magnetic hexagonal driver bit that is configured to be operably coupled with a drill or similar tool wherein the magnet assembly includes an engagement member configured to provide a user an ability to move the magnet assembly intermediate its first position and second position.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
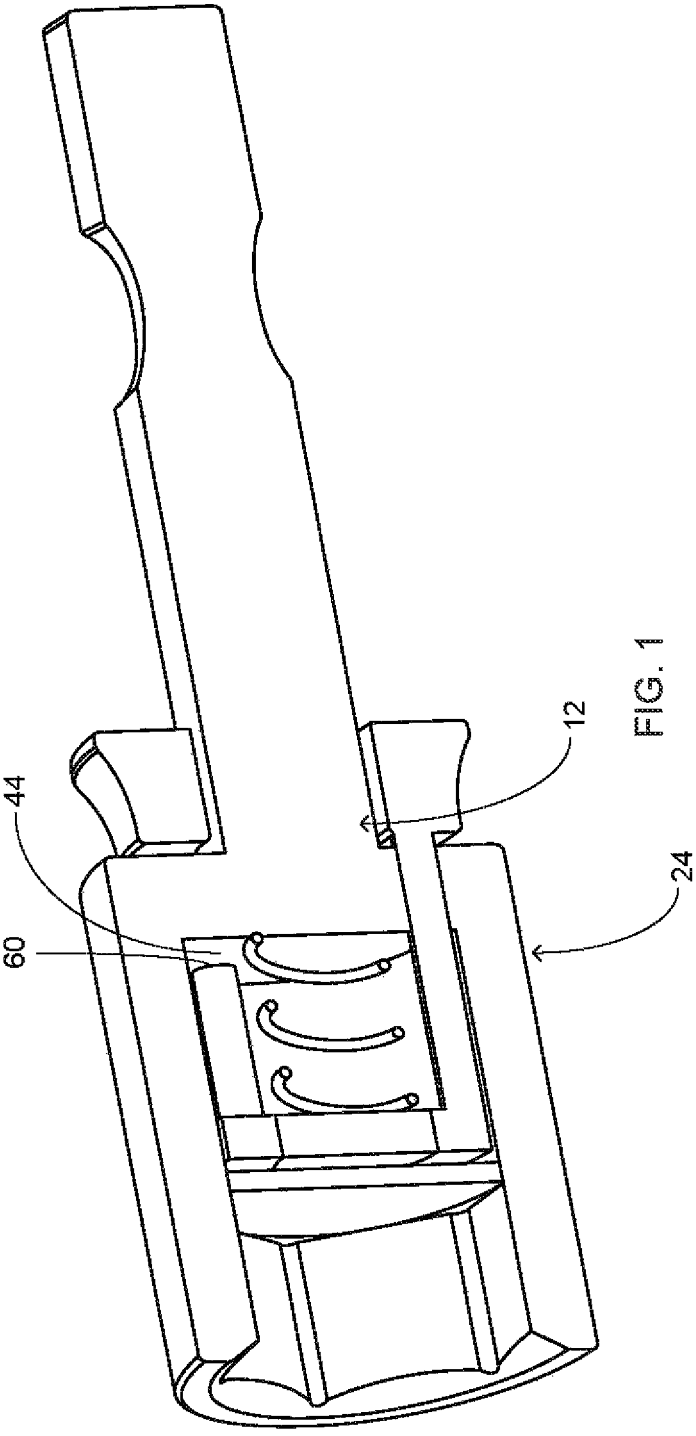
FIG. 1 is a cross-sectional of the present invention with the magnet assembly in its first position.

Referring now to the drawings submitted herewith, wherein various elements depicted therein are not necessarily drawn to scale and wherein through the views and figures like elements are referenced with identical reference numerals, there is illustrated a driver bit 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the driver bit 100 includes a shaft member 10 wherein the shaft member 10 includes a first end 11 and a second end 12. The shaft member 10 is manufactured from a rigid material such as but not limited to metal. The shaft member 10 can be provided in alternate lengths and diameters and is configured to be inserted into the chuck of a drill or impact wrench. While the shaft member 10 is illustrated herein as having hexagonal outer surface designed to engage jaws of a chuck of the tool to which the driver bit 100 is being operably coupled, it is contemplated within the scope of the present invention that the outer surface of the shaft member 10 could be provided in alternate shapes so as to operably couple with a desired tool.

Integrally formed with the second end 12 of the shaft member 10 is the body member 20. The body member 20 is cylindrical in shape having opening 22 wherein the opening 22 provides access to cavity 30. The cavity 30 includes an inner wall 32 wherein the inner wall 32 is hexagonal in shape so as to operable couple with the head of a conventional fastener (not particularly illustrated herein). The cavity 30 is provided with a sufficient depth so as to ensure the cavity 30 completely engages with the head of a conventional fastener. While the inner wall 32 in the preferred embodiment is hexagonal in shape, it is contemplated within the scope of the present invention that the inner wall 32 could be provided in alternate shapes so as to mateably couple to a head of a fastener. The cavity 30 further includes a bottom plate member 40 distally located from opening 22. The bottom plate member 40 is formed so as to inhibit material from egressing therepast. The bottom plate member 40 separates the cavity 30 from void 50. Void 50 is formed in the body member 20 intermediate the shaft member 10 and the bottom plate member 40. Rearward of the void 50 is wall member 44 wherein wall member 44 is proximate the second end 24 of the body member 20. The wall member 44 has formed therein apertures 60 wherein the apertures 60 have the rod members 70 of the magnet assembly 80 slidably traverse therethrough in a backwards-forwards motion. It should be understood that the wall member 44 could have formed therein alternate quantities of apertures 60 in order to allow the rod members 70 of the magnet assembly 80 to move between its first position and its second position as discussed herein.

The magnet assembly 80 includes a first ring member 81, a second ring member 82 and rod members 70 wherein the rod members 70 operably couple the first ring member 81 and the second ring member 82. While three rod members 70 are illustrated herein providing coupling of the first ring member 81 and second ring member 82, it is contemplated within the scope of the present invention that the magnet assembly 80 could utilize less than or more than three rod members 70 to operably couple the first ring member 81 and second ring member 82. The first ring member 81 includes center void 83 wherein the center void 83 is configured to have the magnet member 84 secured therein. Second ring member 82 includes center void 89 wherein the center void 89 is configured to surroundably mount the shaft member 10 proximate the second end 12 thereof. The second ring member 82 includes outer peripheral edge wall 85 shaped to provide a technique for a user to engage therewith in order to move the magnet assembly 80 between its first position and its second position. While the outer peripheral edge wall 85 has a slope increasing towards the shaft member 10, it should be understood within the scope of the present invention that the outer peripheral edge wall 85 could be formed in alternate shapes or employ additional elements so as to facilitate engagement with a user. Furthermore, it is further contemplated within the scope of the present invention that the first ring member 81 could be magnetic so as to eliminate requirement for mounting of the magnet member 84 thereto. Additionally, the first ring member 81 could be formed from a solid magnetic material having no opening therein.

Figure 2:
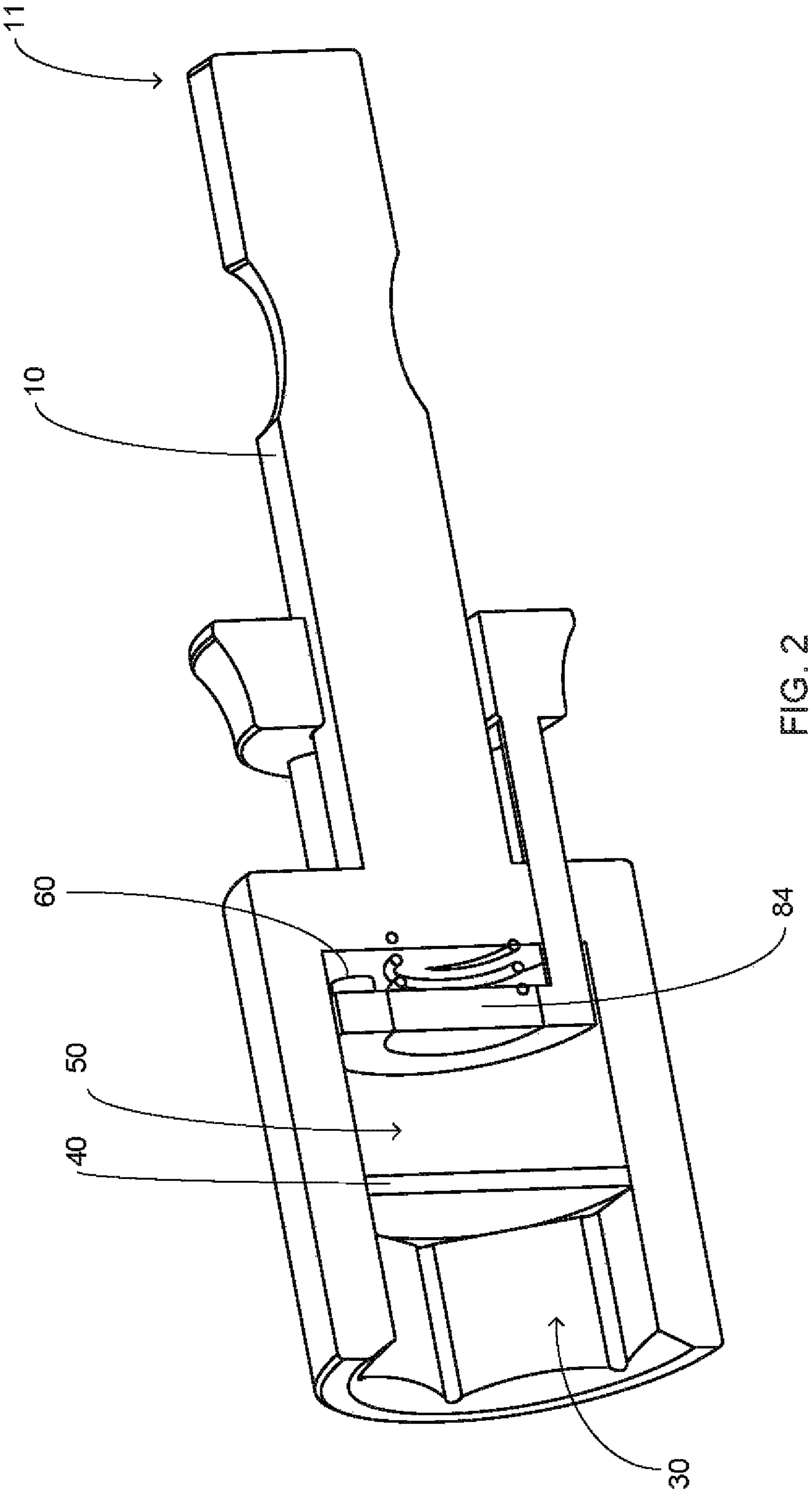
FIG. 2 is a cross-sectional of the present invention with the magnet assembly in its second position.
Figure 3:
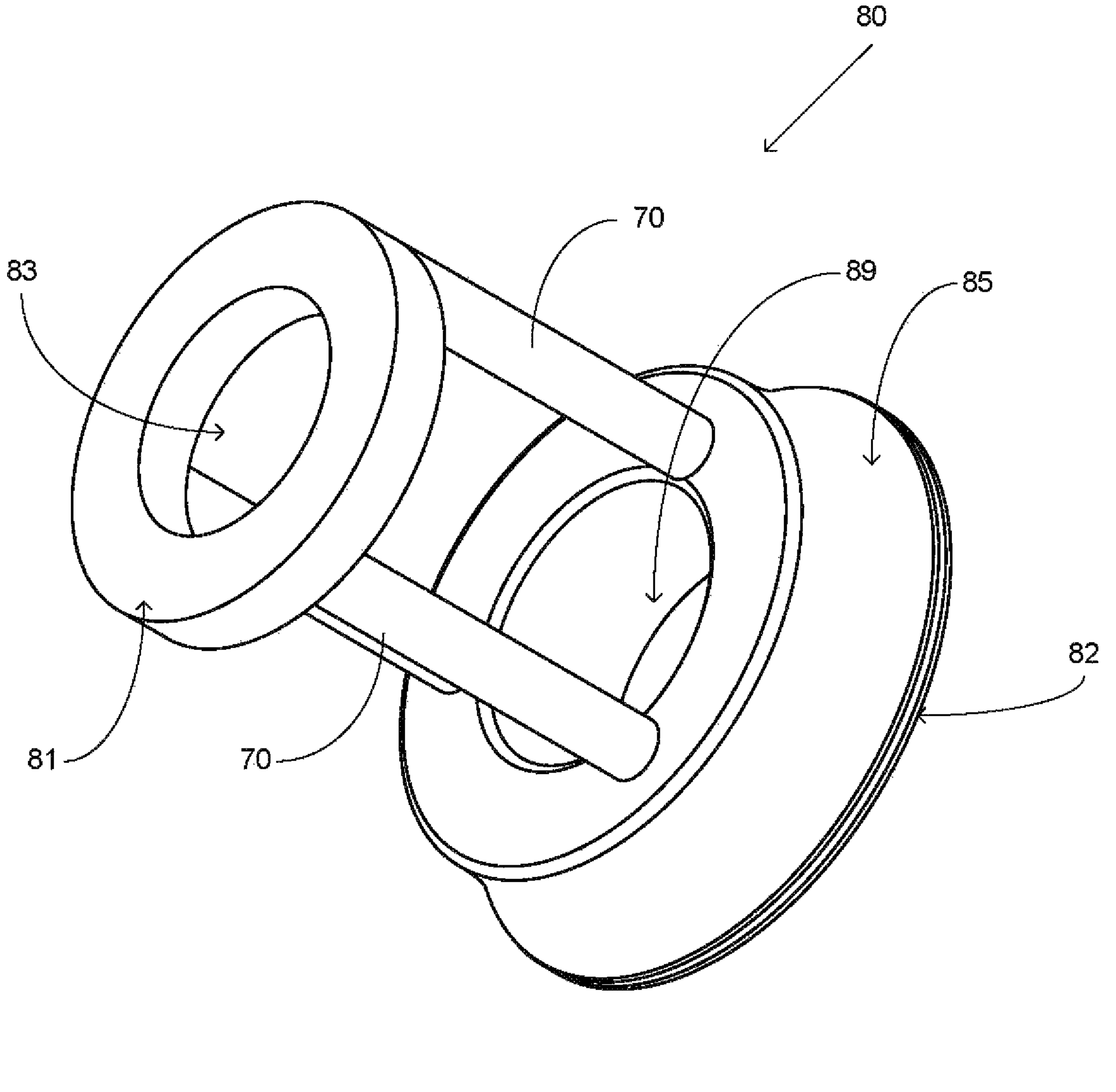
FIG. 3 is a perspective view of the magnet assembly of the present invention.
Figure 4:
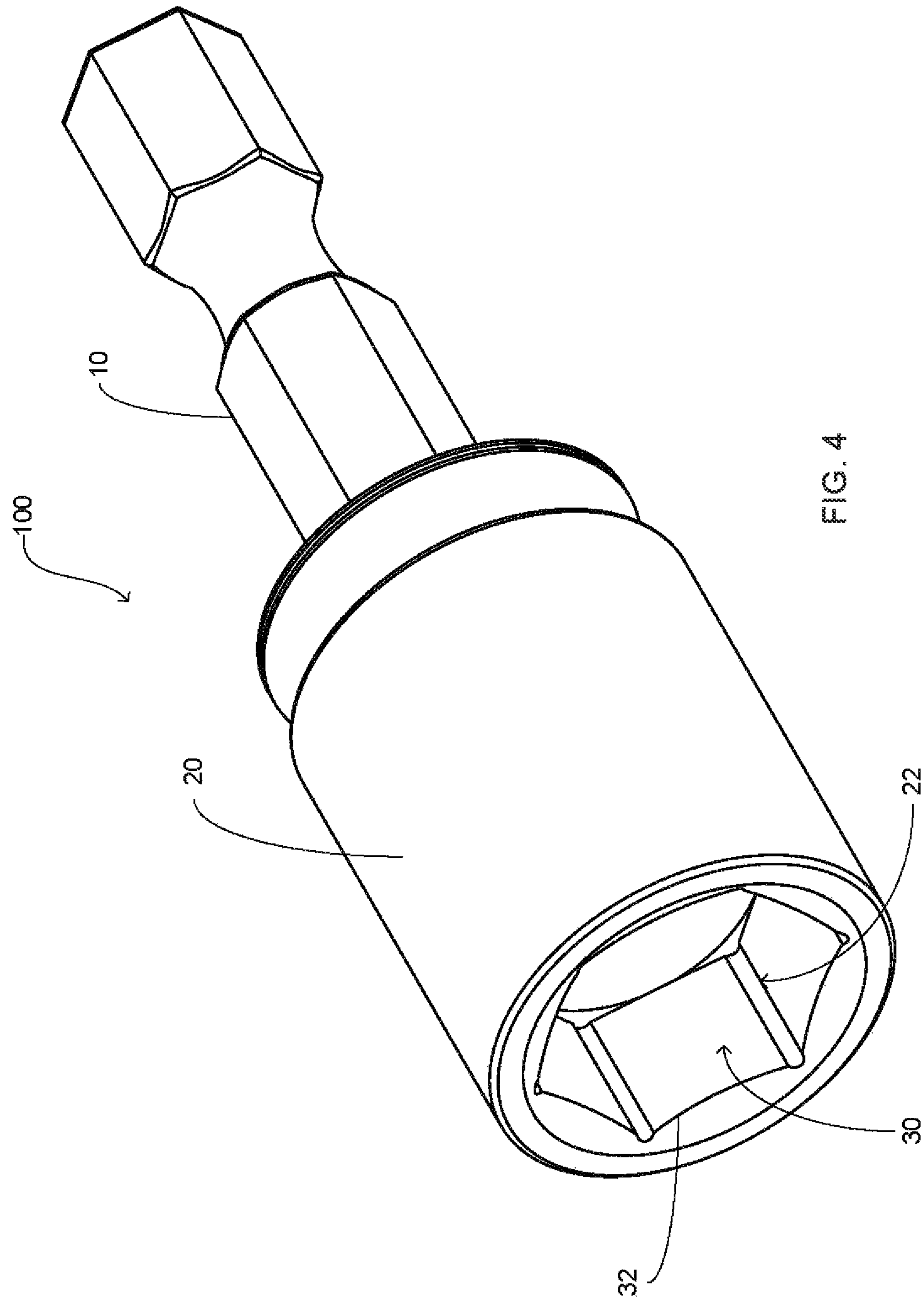
FIG. 4 is a perspective view of the present invention.

The magnet assembly 80 is operable to move between a first position and a second position. In the first position, the first ring member 81 is adjacent the bottom plate member 40. In the first position the magnet member 84 is adjacent the bottom plate member 40 and is sufficiently close enough to a fastener head disposed in the cavity 30 to releasably secure the fastener within the driver bit 100. In the second position, illustrated herein in FIG. 2, the magnet member 84 has been slidably traversed within the void 50 so as to be distal to the bottom plate member 40. In the second position, the magnetic field of the magnet member 84 present at the bottom plate member 40 has been diminished sufficiently so as to allow any magnetic material deposits trapped in the cavity 30 to be removed therefrom. The magnet assembly 80 is moved between its first position and its second position employing movement member 90. Movement member 90 is secured between the first ring member 81 and the wall member 44. The movement member 90 biases the first ring member 81 against the bottom plate member 40 in the first position of the magnet assembly 80. In its second position, the movement member 90 is compressed so as to allow the first ring member 81 to be slidably traversed within the void 50 away from the bottom plate member 40. In a preferred embodiment of the movement member 90, the movement member 90 is a spring but it is contemplated within the scope of the present invention that the movement member 90 could be manufactured from alternate elements and achieve the desired objective discussed herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A driver bit configured to be operably coupled to a rotary tool wherein the driver bit is configured to engage a fastener head and wherein the driver bit comprises:

a shaft member, said shaft member being elongated in form having a first end and a second end, said shaft member having a first end and a second end;

a body member, said body member being cylindrical in shape, said body member having a first end and a second end, said body member having an opening proximate said first end thereof providing access to a cavity, said cavity having an inner wall formed to mateably engage a fastener head, said cavity having a bottom plate member distal to said opening, said body member further having a void, said void of said body member being intermediate said bottom plate member and a rear wall proximate said second end of said body member, said rear wall further including at least two apertures bored therethrough; and a magnet assembly, said magnet assembly movably coupled to said body member, said magnet assembly movable between a first position and a second position, said magnet assembly having a first ring member and a second ring member, said first ring member and said second ring member having at least two rod members operably coupling said first ring member and said second ring member, said first ring member being movably disposed within said void of said body member, said second ring member being located adjacent to said body member proximate said second end of said body member; and wherein said first ring member is adjacent said bottom plate member in the first position of said magnet assembly.

2. The bit configured to be operably coupled to the rotary tool as recited in claim 1, wherein said first ring member further includes a center void, said center void of said first ring member having a magnet member secured therein.

3. The bit configured to be operably coupled to the rotary tool as recited in claim 2, and further including a movement member, said movement member being disposed within said void of said body member intermediate said rear wall and said first ring member, said movement member operable to move the magnet assembly between said first position and said second position.

4. The bit configured to be operably coupled to the rotary tool as recited in claim 3, wherein said first ring member is distal to said bottom plate member in said second position of said magnet assembly.

5. The bit configured to be operably coupled to the rotary tool as recited in claim 4, wherein said inner wall of said cavity of said body member is hexagonal in form.

6. The bit configured to be operably coupled to the rotary tool as recited in claim 5, wherein said second ring member further includes an outer peripheral edge wall, said outer peripheral edge wall being angular in form.

7. The bit configured to be operably coupled to the rotary tool as recited in claim 6, wherein said movement member is a spring.

8. The bit configured to be operably coupled to the rotary tool as recited in claim 7, wherein said at least two rod members are journaled through said at least two apertures of said rear wall and movable therethrough.

* * * * *